United States Patent
Yang et al.

(10) Patent No.: US 8,224,373 B2
(45) Date of Patent: Jul. 17, 2012

(54) UPLINK POWER CONTROL IN WIRELESS NETWORKS

(75) Inventors: Rongzhen Yang, Shanghai (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 12/843,940

(22) Filed: Jul. 27, 2010

(65) Prior Publication Data

US 2011/0159913 A1   Jun. 30, 2011

Related U.S. Application Data

(60) Provisional application No. 61/291,787, filed on Dec. 31, 2009.

(51) Int. Cl.
*H04B 7/00* (2006.01)
(52) U.S. Cl. ............ 455/522; 455/69; 455/70; 370/318; 370/319; 370/320
(58) Field of Classification Search ............. 455/522, 455/69–70; 370/318–320
See application file for complete search history.

(56) References Cited

U.S. PATENT DOCUMENTS

2010/0291962 A1* 11/2010 Kim et al. ............. 455/522

FOREIGN PATENT DOCUMENTS

WO   2010005236 A2   1/2010

OTHER PUBLICATIONS

Yang, et al., "Proposed definition text for NI field in S-SFH SP3 IE (IEEE 802.16m/D3 Amendment)", IEEE 802.16 Broadband Wireless Access Working Group, Dec. 31, 2009, pp. 1-8.

* cited by examiner

*Primary Examiner* — Fayyaz Alam
(74) *Attorney, Agent, or Firm* — Cool Patent, P.C.; Kenneth J. Cool

(57) ABSTRACT

Briefly, in accordance with one or more embodiments, one or more interference over thermal noise (IoT) values may be measured for one or more frequency partitions or a sounding area, or combinations thereof, and a difference between a current IoT value and a previous IoT value may be evaluated. If the difference is greater than or equal to a reset threshold, the current IoT value is broadcast to a mobile station to reset the IoT value. Otherwise an IoT differential value is broadcast to the mobile station to update the IoT with the IoT differential value. The mobile station may then perform open loop power control based on the IoT value for uplink broadcast.

20 Claims, 5 Drawing Sheets

UPLINK POWER CONTROL IN WIRELESS NETWORKS

CROSS-REFERENCE TO RELATED APPLICATIONS

The present application claims the benefit of U.S. Application No. 61/291,787 filed Dec. 31, 2009. Said Application No. 61/291,787 is hereby incorporated herein by reference in its entirety.

BACKGROUND

In broadband wireless communication systems such as those compliant with the Worldwide Interoperability for Microwave Access (WiMAX) or Long Term Evolution (LTE) standards, noise and interference (NI) information may be communicated between two stations or devices to support uplink open loop power control. Broadband wireless communication networks typically employ orthogonal frequency-division multiplexing (OFDM) and/or orthogonal frequency-division multiple access (OFDMA) with multiple-input and multiple-output (MIMO) for multicarrier signal modulation and to increase communication performance. In such systems, uplink power control for a mobile station may be useful to balance the link performance and the batter power of the mobile station, and to reduce inter base station uplink co-channel interference.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
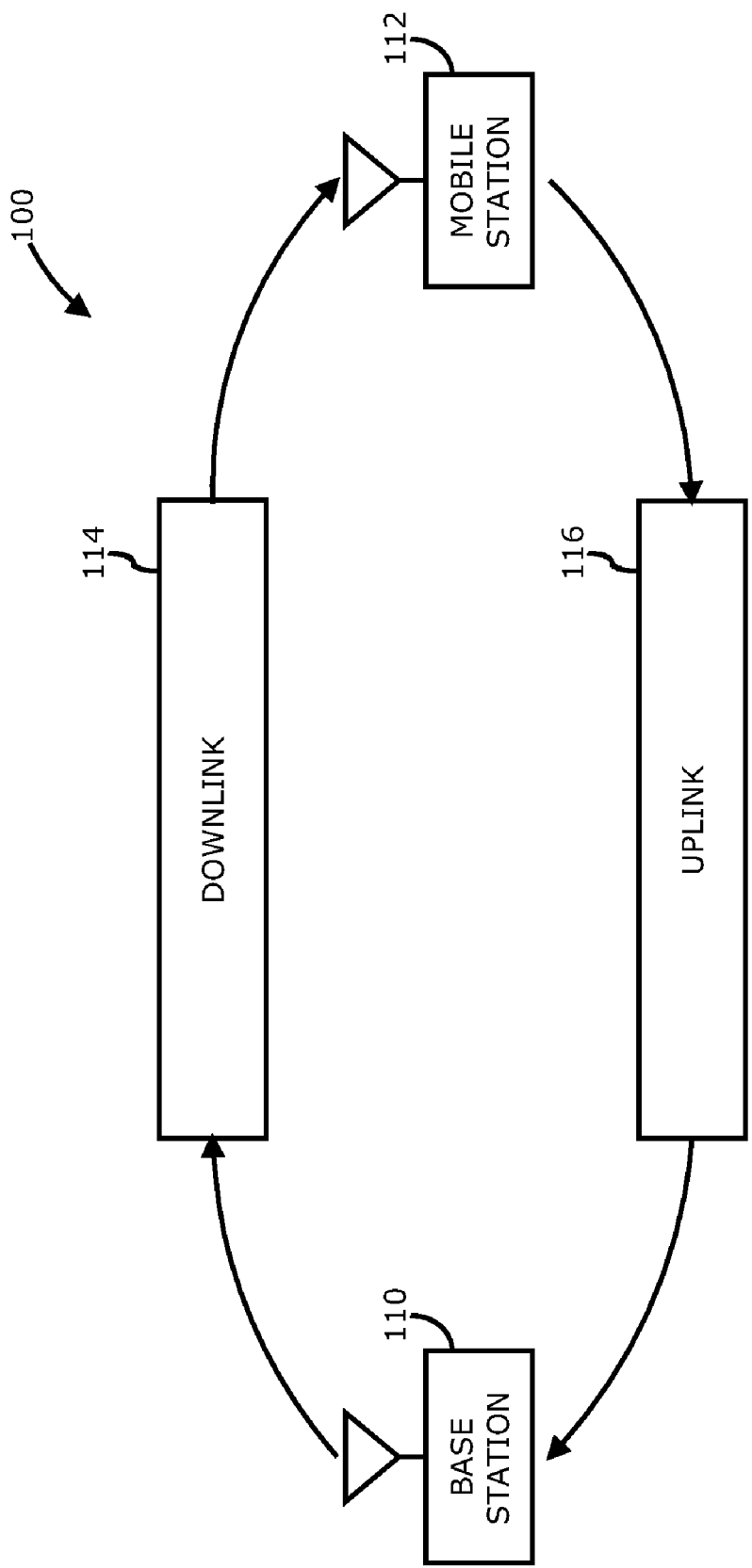
FIG. 1 is a diagram of a wireless network showing a downlink and an uplink between a mobile station and a base station in a wireless network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a wireless network showing a downlink and an uplink between a mobile station and a base station in a wireless network in accordance with one or more embodiments will be discussed. As shown in FIG. 1, a wireless network 100 may comprise, among other network elements, a base station 110 communicating with a mobile station 112 via downlink 114 communications. Likewise, mobile station 112 may communicate with base station 110 via uplink 116 communications. In some embodiments, base station 110 may comprise a base transceiver station (BTS), an advanced base station (ABS), a relay station (RS), or an advanced relay station (ARS), although the scope of the claimed subject matter is not limited in this respect. Likewise, mobile station 112 may comprise an advanced mobile station (AMS) or generically a subscriber station (SS), although the scope of the claimed subject matter is not limited in this respect.

In one or more embodiments, orthogonal frequency-division multiplexing (OFDM) and/or orthogonal frequency-division multiple access (OFDMA) with multiple-input and multiple-output (MIMO) may be utilized for network 100. Uplink power control in uplink 116 may be utilized to control the transmit power level from mobile station 112 to base station 110 to balance the performance of uplink 116 and the battery power of mobile station 112. Uplink power control in uplink 116 further may be implemented to reduce uplink 116 co-channel interference between base station 110 and other neighboring base stations (inter-base station uplink co-channel interference). In one or more embodiments, the uplink 116 noise and interference (NI) may be broadcast by a broadcast media access control (MAC) message AAI_ULPC_NI as an interference over thermal noise ratio (IoT) level as shown, below:

```
-- ASN1START AAI_ULPC_NIMessage :: = SEQUENCE {
    UL_NI_Information :: = SEQUENCE {
        IOT_Sounding    INTEGER (0..127) OPTIONAL
        IOT_FP0         INTEGER (0..127) OPTIONAL
        IOT_FP1         INTEGER (0..127) OPTIONAL
        IOT_FP2         INTEGER (0..127) OPTIONAL
        IOT_FP3         INTEGER (0..127) OPTIONAL
    }
}
-- ASN1STOP
```

The AAI broadcast message of the NI value may provide the flexibility of different broadcast periods, but may suffer for high signaling overhead for the MAC message header and resource assignment information. If the NI message is broadcast for a period of seconds or more, the overhead may be acceptable. However, if the NI message is updated in a period of hundreds of milliseconds, the overhead may be more significant.

For balancing between signaling overhead, the NI field may be in a superframe header (SFH) such as a secondary superframe header SP3 information element (S-SFH SP3 IE) as the differential values based on the IoT values broadcast by the AAI_ULPC_NI message, to provide a shorter NI broadcast period without significantly increasing signaling overhead. In one or more embodiments, a total 10 bits in the NI field may be defined to support the correction of a maximum of five IoT values broadcast by AAI_ULPC_NI, 2 bits for one IoT value, wherein the correction value is shown in Table 1, below:

TABLE 1

IoT Correction Values

| 2 Bits Value | IoT Correction Value (dB) |
|---|---|
| 0b00 | 1.0 |
| 0b01 | 0.5 |
| 0b10 | 0.0 |
| 0b11 | −0.5 |

When mobile station 112 receives the IoT correction values from the S-SFH SP3 IE, the correction values may be cumulatively applied into the IoT value received by the latest AAI_ULPC_NI message as shown in Equation 1, below, until the new AAI_DL_IM message is received and the related IoT values are reset:

$$IoT\_X = IoT\_X(\text{last}) + IoT\_X\_CorrectionValue$$

where IoT_X represents the current value of IoT_Sounding, IoT_FP0, IoT_FP1, IoT_FP2, IoT_FP3 accordingly; IoT_X (last) represents the latest value of IoT_Sounding, IoT_FP0, IoT_FP1, IoT_FP2, IoT_FP3 accordingly, before the IoT correction values are applied; IoT_X_CorrectionValue is the IoT correction value indicated by the S-SFH SP3 IE for IoT_Sounding, IoT_FP0, IoT_FP1, IoT_FP2, and IoT_FP3, accordingly.

Figure 2:
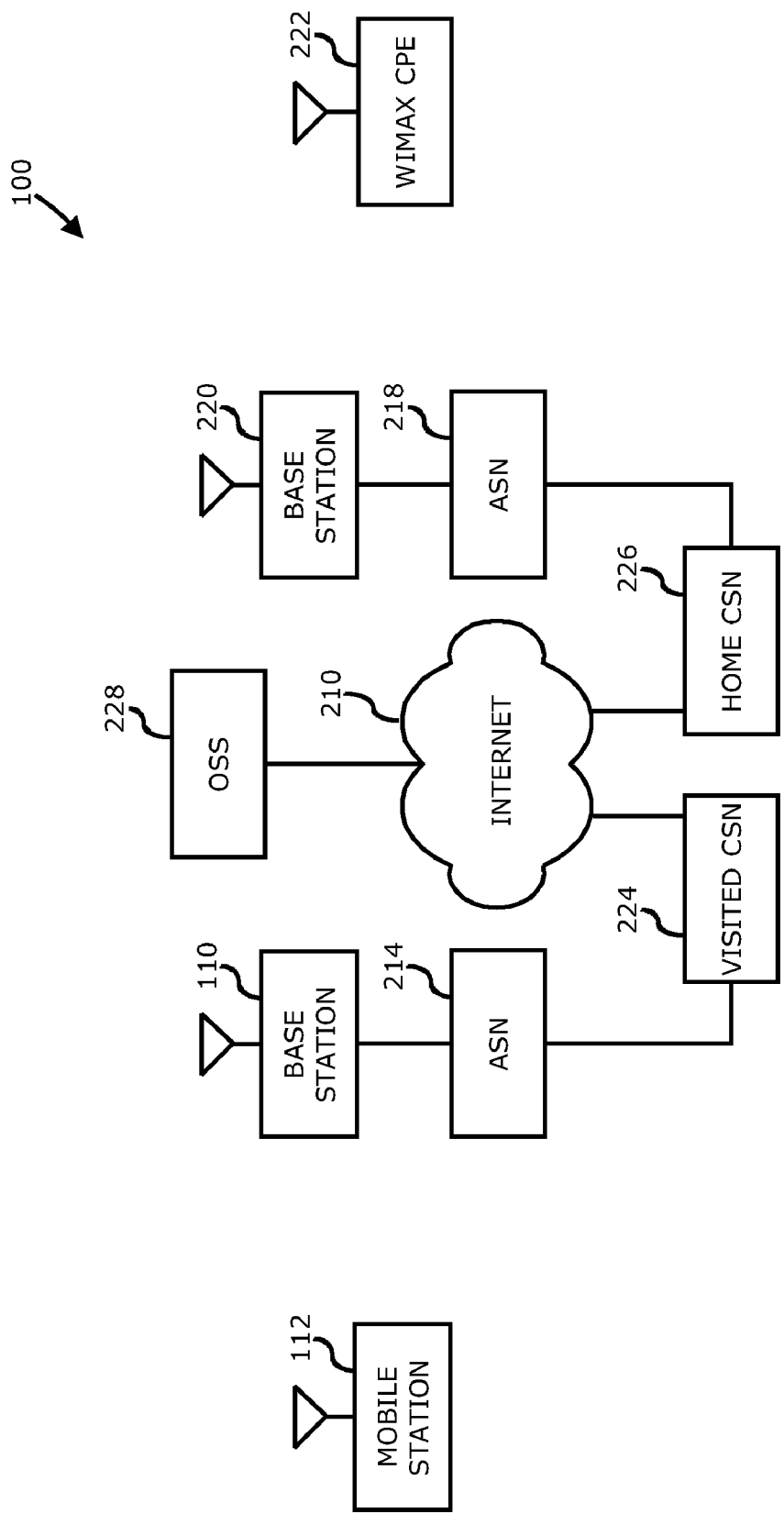
FIG. 2 is a block diagram of a broadband wireless network in accordance with one or more embodiments.

Referring now to FIG. 2, a block diagram of a broadband wireless network in accordance with one or more embodiments will be discussed. As shown in FIG. 2, network 100 may be an internet protocol (IP) type network comprising an internet 210 type network or the like that is capable of supporting mobile wireless access and/or fixed wireless access to internet 210. In one or more embodiments, network 100 may be in compliance with a Worldwide Interoperability for Microwave Access (WiMAX) standard or future generations of WiMAX such as WiMAX-II, and in one particular embodiment may be in compliance with an Institute for Electrical and Electronics Engineers 802.16m standard (IEEE 802.16m). In one or more alternative embodiments network 100 may be in compliance with a Third Generation Partnership Project Long Term Evolution (3GPP LTE or just LTE) or a 3GPP2 Air Interface Evolution (3GPP2 AIE) standard or future generations such as Fourth Generation (4G) standards and so on. In general, network 100 may comprise any type of orthogonal frequency division multiple access (OFDMA) based wireless network, and the scope of the claimed subject matter is not limited in these respects.

As an example of mobile wireless access, access service network (ASN) 214 is capable of coupling with base station (BS) 110 to provide wireless communication between mobile station (MS) 116 and internet 110. Mobile station 112 may comprise a mobile type device or information handling system capable of wirelessly communicating via network 100, for example a notebook type computer, a cellular telephone, a personal digital assistant, or the like. ASN 214 may implement profiles that are capable of defining the mapping of network functions to one or more physical entities on network 100. Base station 110 may comprise radio equipment to provide radio-frequency (RF) communication with mobile station 112, and may comprise, for example, the physical layer (PHY) and media access control (MAC) layer equipment in compliance with an IEEE 802.16m type standard. Base station 110 may further comprise an IP backplane to couple to internet 110 via ASN 214, although the scope of the claimed subject matter is not limited in these respects.

Network 100 may further comprise a visited connectivity service network (CSN) 224 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VOIP) gateways, and/or internet protocol (IP) type server functions, or the like. However, these are merely example of the types of functions that are capable of being provided by visited CSN or home CSN 226, and the scope of the claimed subject matter is not limited in these respects. Visited CSN 224 may be referred to as a visited CSN in the case for example where visited CSN 224 is not part of the regular service provider of mobile station 112, for example where mobile station 112 is roaming away from its home CSN such as home CSN 226, or for example where network 100 is part of the regular service provider of mobile station but where network 100 may be in another location or state that is not the main or home location of mobile station 112. In a fixed wireless arrangement, WiMAX type customer premises equipment (CPE) 222 may be located in a home or business to provide home or business customer broadband access to internet 210 via base station 220, ASN 218, and home CSN 226 in a manner similar to access by mobile station 112 via base station 110, ASN 214, and visited CSN 224, a difference being that WiMAX CPE 222 is generally disposed in a stationary location, although it may be moved to different locations as needed, whereas mobile station 112 may be utilized at one or more locations if mobile station 112 is within range of base station 110 for example. In accordance with one or more embodiments, operation support system (OSS) 228 may be part of network 100 to provide management functions for network 100 and to provide interfaces between functional entities of network 100. Network 100 of FIG. 2 is merely one type of wireless broadband network showing a certain number of the components and network elements of network 100, however the scope of the claimed subject matter is not limited in these respects.

Figure 3:
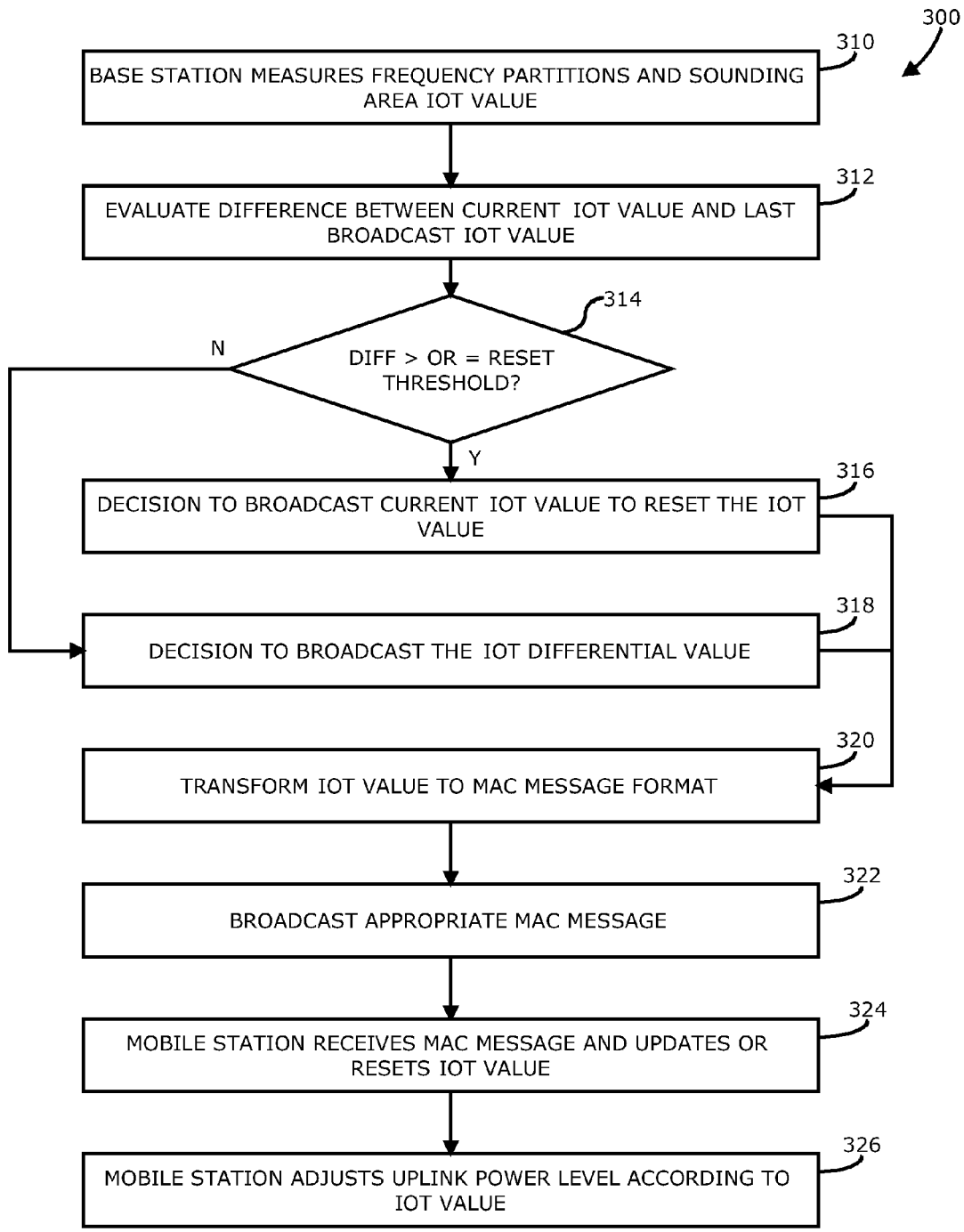
FIG. 3 is a flow diagram of a method for uplink power control in accordance with one or more embodiments.

Referring now to FIG. 3, a flow diagram of a method for uplink power control in accordance with one or more embodiments will be discussed. Although FIG. 3 shows one particular order of method 300, it should be noted that the blocks of method 300 may be arranged in various alternative orders, including more or fewer blocks than shown, and the scope of the claimed subject matter is not limited in these respects. Method 300 may be implemented, for example, by base station 110 and/or mobile station 112 of network 100. When method 300 is implemented in an IEEE 802.16m based system, an interference over thermal noise ratio (IoT) level may be measured by the base station 110 and then broadcast according to the format defined in Table 1, above and/or in a MAC message defined as AAI_ULPC_NI in the IEEE 802.16m specification. Method 300 illustrates an example procedure for measurement of the IoT value by the base station 110 to be broadcast by the base station 110 to mobile station 112. At block 310, base station 110 measures measure frequency partitions, for example up to a maximum number of four partitions in accordance with the IEEE 802.16m, and also the sounding area IoT (or NI) value, expressed as IoT_FPi (i=0, 1, 2, 3) and IoT_Sounding. At block 312, base station 110 may evaluate a difference between a current IoT value and the last or a previously broadcast IoT value. The difference may then be compared at block 314 to a reset threshold value to determine how the current IoT value will be broadcast. For example, such a difference evaluation and comparison may be made according to the following equation:

IoT_*X*−IoT_*X*(last)≧RESET_Threshold (dB)

In one or more embodiments, IoT_X may represent the current measured value of IoT_Sounding, IoT_FP0, IoT_FP1, IoT_FP2, IoT_FP3 accordingly in the base station 110, IoT_X(last) may represent the latest broadcast value of IoT_Sounding, IoT_FP0, IoT_FP1, IoT_FP2, IoT_FP3 accordingly, and RESET_Threshold (dB) may be the threshold value set by the base station 110. Alternatively, the base station 110 may implement other similar rules and the scope of the claimed subject matter is not limited in this respect.

At block 316, if the difference between the current IoT value and a previous IoT value is greater than or equal to a reset threshold as evaluated by the above equation, a decision is made to broadcast the current IoT value in a AAI_ULPC_NI message to reset the IoT value. Otherwise, at block 318 if the difference between the current IoT value and a previous IoT value is not greater than or equal to a reset threshold, then a decision is made to broadcast the IoT differential value in an S-SFH SP3 IE. At block 320, after the NI value of identical FP or Sounding area is decided to be broadcast, the IoT value may be transformed into a 10 bit format as shown in and described with respect to Table 1, above. The appropriate MAC message may then be broadcast at block 322 from the base station 110 to the mobile station 112 for implementation of uplink open loop power control by the mobile station 112 in response to the received IoT value.

In one or more embodiments, for example in a system compliant with the IEEE 802.16m, open loop power control (OLPC) may be implemented by the following OLPC formula:

$P(dBm)=L+SINR_{Target}+NI+Offset$ where $SINR_{Target}$ is the target uplink signal-to-interference noise ratio (SINR) received by the base station 110. The mode used to calculate the $SINR_{Target}$ value may be signaled through a power control message:

$$SINR_{Target} = 10\log10\left(\max\left(10^{\wedge}\left(\frac{SINR_{MIN}(dB)}{10}\right), \gamma_{IoT} \times SIR_{DL} - \alpha\right)\right) - \beta \times 10\log10(TNS)$$

where P is the transmit power level (dBm) per subcarrier per stream for the current transmission, L is the estimated average current uplink propagation loss that includes the transmit antenna gain and path loss for the mobile station 112, NI is the estimated average power level (dBm) of the noise and interference per subcarrier at the base station 110 not including the receive antenna gain of the base station 110, Offset is a correction term for a mobile station 112 specific power offset that is controlled by the base station 110 through power control messages. There are two kinds of Offset values, $Offset_{Data}$ and $Offset_{Control}$, which are used for data and control, respectively. Continuing with method 300, after mobile station 112 receives the S-SFH SP3 IE MAC message at block 324, the IoT value may be updated or reset, and then the mobile station 112 may adjust the uplink power control at block 326 based at least in part on the IoT value.

Figure 4:
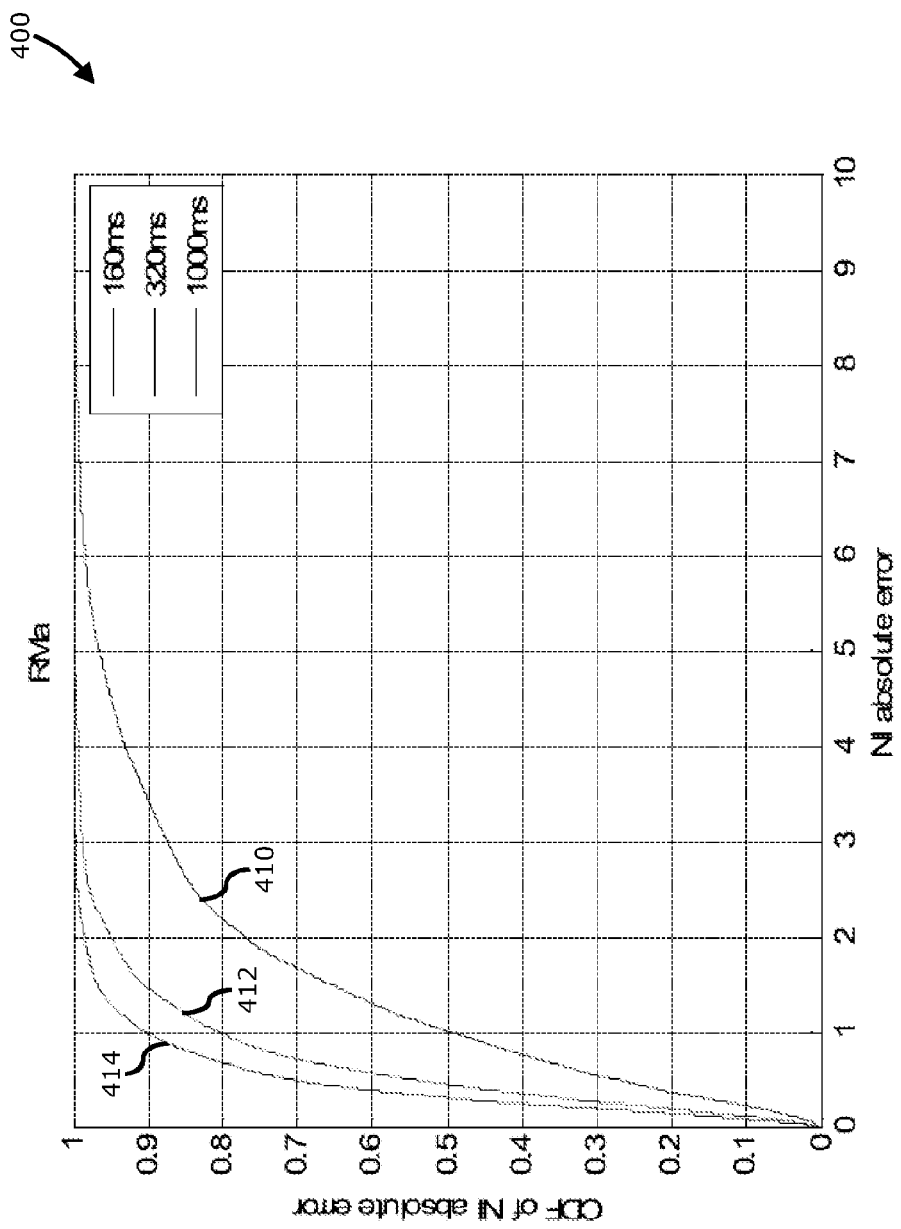
FIG. 4 is a plot of the cumulative distribution function (CDF) of noise and interference (NI) absolute error versus NI absolute error for various NI periods in accordance with one or more embodiments.

Referring now FIG. 4, a plot of the cumulative distribution function (CDF) of noise and interference (NI) absolute error versus noise and interference (NI) absolute error for various NI periods in accordance with one or more embodiments will be discussed. In one or more embodiments, an IEEE 802.16m baseline simulation may be made. For full buffer transmission, when the location of mobile station 112 changes over time, an analysis may be made regarding the major reason of the change of broadcast NI value since the changing location of the mobile station 112 may affect the slow fading and fast fading with respect to a neighboring base station 110. Furthermore, the active status of the mobile station 112 may affect the NI value, for example due to an initial access or handover, an active or sleep/idle state, and/or different traffic models, among others. In the evaluation shown in FIG. 4, the location change of the mobile station was evaluated for the moving speed and the impact of the broadcast NI information change. For simplification of the evaluation, only one interference mobile station was assumed, and only the slow fading change based on the moving speed of the mobile station 112 was considered. Based on the simplified assumption, NI broadcast periods of 160 ms (32 frames), 320 ms (64 frames), 1000 ms (1 second, 200 frames) were evaluated to plot NI absolute error CDF for different slow fading settings. Graph 400 of FIG. 4 shows an International Mobile Telecommunications-Advanced (IMT-Adv) Rural Macrocell (RMa) of 120 km/hr. Plot 410 shows an NI broadcast period of 1000 ms, plot 412 shows an NI broadcast period of 320 ms, and plot 414 shows an NI broadcast period of 160. Similar evaluations (not shown) were made for IMT-Adv Urban Microcell (UMi) of 3 km/hr and IMT-Adv Urban Macrocell (UMa) of 30 km/hr. The results are summarized in Table 2, below.

TABLE 2

| CDF 95% Point For Different NI Broadcast Periods | | | |
|---|---|---|---|
| | UMi | UMa | RMa |
| 160 ms | 0.15 | 0.50 | 1.30 |
| 320 ms | 0.20 | 0.70 | 2.05 |
| 1000 ms | 0.50 | 1.85 | 4.55 |

Based on the simulation results in Table 2, the 95%-tile NI absolute error may be summarized wherein by using S-SFH SP3 IE broadcast, shorter NI broadcast periods may obtain different gains based on the moving speed of the interference source. Such gains may range from about 0.3 dB to about 2.5 dB, although the scope of the claimed subject matter is not limited in this respect.

Figure 5:
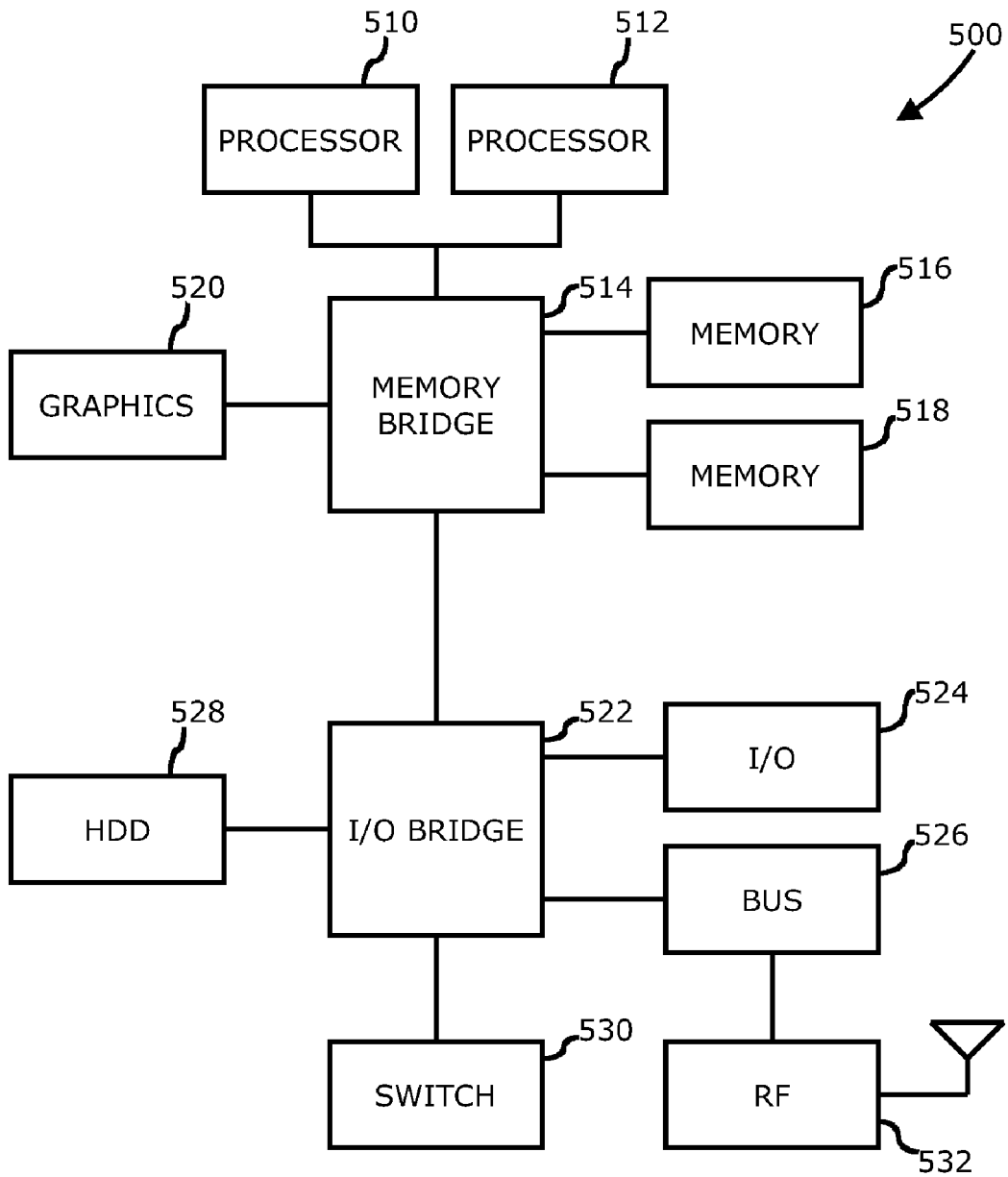
FIG. 5 is a block diagram of an information handling system capable of implementing uplink power control in a wireless network in accordance with one or more embodiments.

Referring now to FIG. 5, a block diagram of an information handling system capable of implementing uplink power control in a wireless network in accordance with one or more embodiments. Information handling system 500 of FIG. 5 may tangibly embody one or more of any of the network elements of network 100 as shown in and described with respect to FIG. 1 and/or FIG. 2. For example, information handling system 500 may represent the hardware of base station 110 and/or mobile station 112, with greater or fewer components depending on the hardware specifications of the particular device or network element. Although information handling system 500 represents one example of several types of computing platforms, information handling system 500 may include more or fewer elements and/or different arrangements of elements than shown in FIG. 5, and the scope of the claimed subject matter is not limited in these respects.

Information handling system 500 may comprise one or more processors such as processor 510 and/or processor 512, which may comprise one or more processing cores. One or more of processor 510 and/or processor 512 may couple to one or more memories 516 and/or 518 via memory bridge 514, which may be disposed external to processors 510 and/or 512, or alternatively at least partially disposed within one or more of processors 510 and/or 512. Memory 516 and/or memory 518 may comprise various types of semiconductor based memory, for example volatile type memory and/or non-volatile type memory. Memory bridge 514 may couple to a graphics system 520 to drive a display device (not shown) coupled to information handling system 500.

Information handling system 500 may further comprise input/output (I/O) bridge 522 to couple to various types of I/O systems. I/O system 524 may comprise, for example, a universal serial bus (USB) type system, an IEEE 1394 type system, or the like, to couple one or more peripheral devices to information handling system 500. Bus system 526 may comprise one or more bus systems such as a peripheral component interconnect (PCI) express type bus or the like, to connect one or more peripheral devices to information handling system 500. A hard disk drive (HDD) controller system 528 may couple one or more hard disk drives or the like to information handling system, for example Serial ATA type drives or the like, or alternatively a semiconductor based drive comprising flash memory, phase change, and/or chalcogenide type memory or the like. Switch 530 may be utilized to couple one or more switched devices to I/O bridge 522, for example Gigabit Ethernet type devices or the like. Furthermore, as shown in FIG. 5, information handling system 500 may include a radio-frequency (RF) block 532 comprising RF circuits and devices for wireless communication with other wireless communication devices and/or via wireless networks such as network 100 of FIG. 1 and/or FIG. 2, for example where information handling system 500 embodies base station 110 and/or mobile station 112, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to uplink power control in wireless networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    measuring one or more interference over thermal noise (IoT) values for one or more frequency partitions or a sounding area, or combinations thereof;
    evaluating a difference between a current IoT value and a previous IoT value; and
    in the event the difference is greater than or equal to a reset threshold, broadcasting the current IoT value to a mobile station to reset the IoT value;
    otherwise broadcasting an IoT differential value to a mobile station to update the IoT with the IoT differential value.

2. A method as claimed in claim 1, wherein the current IoT value is broadcast in an AAI_ULPC_NI message to reset the IoT value.

3. A method as claimed in claim 1, wherein the IoT differential value is broadcast in a S-SFH SP3 IE message to update the IoT value.

4. A method as claimed in claim 1, wherein the IoT differential value comprises an uplink power correction value.

5. A method as claimed in claim 1, further comprising formatting the current IoT value to a media access control (MAC) message format prior to said broadcasting the current IoT value to the mobile station to reset the IoT.

6. A method as claimed in claim 1, further comprising formatting the IoT differential value to a media access control (MAC) message format prior to said broadcasting the IoT differential value to the mobile station to update the IoT with the IoT differential value.

7. A method, comprising:
    receiving a power control message broadcast from a base station;
    if the power control message contains a reset interference over thermal noise (IoT) value, resetting the IoT with the reset IoT value;
    if the power control message contains an IoT differential value, updating the IoT value with the IoT differential value; and
    adjusting an uplink power level based at least in part on the IoT value to broadcast to the base station at the adjusted uplink power level.

8. A method as claimed in claim 7, wherein the reset IoT value is received in an AAI_ULPC_NI message to reset the IoT value.

9. A method as claimed in claim 7, wherein the IoT differential value is received in a S-SFH SP3 IE message to update the IoT value.

10. A method as claimed in claim 7, wherein said adjusting comprises open loop power control of the uplink power level.

11. An information handling system, comprising:
    a processor and a memory coupled to the processor, wherein instructions in the memory configure the processor to:

measure one or more interference over thermal noise (IoT) values for one or more frequency partitions or a sounding area, or combinations thereof;

evaluate a difference between a current IoT value and a previous IoT value; and broadcast the current IoT value to a mobile station to reset the IoT value in the event the difference is greater than or equal to a reset threshold;

otherwise broadcast an IoT differential value to a mobile station to update the IoT with the IoT differential value.

12. An information handling system as claimed in claim 11, wherein the current IoT value is broadcast in an AAI_ULPC_NI message to reset the IoT value.

13. An information handling system as claimed in claim 11, wherein the IoT differential value is broadcast in an S-SFH SP3 IE message to update the IoT value.

14. An information handling system as claimed in claim 11, wherein the IoT differential value comprises an uplink power correction value.

15. An information handling system as claimed in claim 11, wherein the processor is further configured to format the current IoT value to a media access control (MAC) message format prior to the broadcast of the current IoT value to the mobile station to reset the IoT.

16. An information handling system as claimed in claim 11, wherein the processor is further configured to format the IoT differential value to a media access control (MAC) message format prior to the broadcast of the IoT differential value to the mobile station to update the IoT with the IoT differential value.

17. An information handling system, comprising:

a processor and a memory coupled to the processor, wherein instructions in the memory configure the processor to:

receive a power control message broadcast from a base station;

reset an interference over thermal noise (IoT) with a reset IoT value if the power control message contains the reset IoT value;

update the IoT value with an IoT differential value if the power control message contains the IoT differential value; and adjust an uplink power level based at least in part on the IoT value to broadcast to the base station at the adjusted uplink power level.

18. An information handling system as claimed in claim 17, wherein the reset IoT value is received in an AAI_ULPC_NI message to reset the IoT value.

19. An information handling system as claimed in claim 17, wherein the IoT differential value is received in an S-SFH SP3 IE message to update the IoT value.

20. An information handling system as claimed in claim 17, wherein said adjusting comprises open loop power control of the uplink power level.

* * * * *